United States Patent [19]

Moseley

[11] Patent Number: 5,212,478
[45] Date of Patent: May 18, 1993

[54] DYNAMIC POWER RECOVERY SYSTEM

[75] Inventor: Robin Moseley, Allentown, Pa.

[73] Assignee: Lutron Electronics Co., Inc., Coopersburg, Pa.

[21] Appl. No.: 807,963

[22] Filed: Dec. 11, 1991

Related U.S. Application Data

[63] Continuation of Ser. No. 332,241, Mar. 31, 1989, abandoned.

[51] Int. Cl.⁵ .............................................. H04Q 1/00
[52] U.S. Cl. ................................. 340/825.72; 315/291; 307/140
[58] Field of Search ............... 340/825.72, 310 CP, 340/638; 323/239; 307/38, 115, 125, 126, 135, 140, 141.4; 315/291, 293, 294, 307, 312, 314, 86, 87, 292, 316, 360; 364/145

[56] References Cited

U.S. PATENT DOCUMENTS

| | | | |
|---|---|---|---|
| 3,746,923 | 7/1973 | Spira et al. | 315/291 |
| 4,336,464 | 6/1982 | Weber | 307/141.4 |
| 4,575,659 | 3/1986 | Pezzolo et al. | 315/360 |
| 4,649,323 | 3/1987 | Peailman et al. | 315/292 |
| 4,684,822 | 8/1987 | Angott | 307/125 |
| 4,689,547 | 8/1987 | Rowen et al. | 315/291 X |
| 4,733,138 | 3/1988 | Pearlman et al. | 315/307 |
| 4,833,339 | 3/1989 | Luchaco et al. | 307/115 |
| 4,889,999 | 12/1989 | Rowen | 307/115 X |
| 4,899,089 | 2/1990 | Hayes | 315/307 X |
| 4,924,109 | 5/1990 | Weber | 307/126 |

OTHER PUBLICATIONS

Lightolier Product Selection Guide, 1989 Edition; Neptune Momentom Section, pp. 4, 5; Crescendo Section, pp. 2, 3.

Lutron Orion System Brochure, "Easy-to-Use Computer Lighting Control", P/N 360-152, Apr. 1985.

*Primary Examiner*—Donald J. Yusko
*Assistant Examiner*—Edwin C. Holloway, III
*Attorney, Agent, or Firm*—Seidel, Gonda, Lavorgna & Monaco

[57] ABSTRACT

A dynamic system is provided by which an electrically-powered load recovers from a power outage after power is restored. In one embodiment, full power is applied to the load when power is first restored and load power is then gradually reduced to a final value. In another embodiment, load power goes from full on to a low value in a series of steps. Initial and final power levels, as well as the sequence of power reductions (or increases), are determined by the system parameters. The system finds particular advantage when the load is controllable by a wireless transmitter.

34 Claims, 7 Drawing Sheets

DYNAMIC POWER RECOVERY SYSTEM

This is a continuation of co-pending application Ser. No. 07/332,241 filed on Mar. 31, 1989, now abandoned.

BACKGROUND OF THE INVENTION

1. Field of the Invention

This invention relates to a system for enabling a power control system load to recover from a power outage after power is restored.

2. Description of the Related Art

Power control systems that receive power from a power source, usually an A.C. power line, and regulate the intensity of a lighting load or the power supplied to other types of loads are well known. Since the A.C. line and other power sources are subject to interruption, such systems must accommodate such interruptions by returning to a known operating condition when the power is restored.

In simple systems, such as standard rotary and linear slide wallbox dimmers, the operating condition to which the system returns is identical to the condition before the interruption (assuming no one has adjusted the control while power was off). This occurs because the dimmer operating condition is completely determined by the position of a mechanical control element. Since this control element position is unaffected by loss of electrical power, the standard dimmer can be said to "remember" its operating condition prior to loss of power even during extended power interruptions. In this case, the memory function is provided by the mechanical friction which prevents the control element from changing its position.

In more complex systems, the condition of the system at any given time during normal operation can depend upon electrical conditions, such as the state of various logic or computer circuits, as well as mechanical conditions like the position of controls or manually operated switches. Unlike mechanical devices, the electrical condition of these circuits does not generally remain constant if electrical power is interrupted for more than a very brief period (on the order of microseconds for some circuits). Therefore, unless special circuitry is used that retains its state without electrical power, or an auxiliary source of power is provided, information about the condition of a control system is lost when a power interruption occurs. In this case, the system lacks a memory function.

Even in a system that has a memory of limited duration, as is the case if an auxiliary power source to sustain the memory is derived from a battery, a charged capacitor, or the like, there is a loss of memory if the interruption is of sufficient duration to exhaust the auxiliary power source.

In systems that lack a memory function, the designer must provide for the condition which the system will assume upon restoration of power. In lighting control systems, one common provision is for the system to assume the "off" condition, such that little or no power is being applied to the load. Such a control system is exemplified by the Neptune series of light dimmers, manufactured by Lightolier.

Even systems that have a memory function may be designed to return to a predetermined condition, independent of the system's condition before the power interruption. One such system is the Orion ® lighting control, manufactured by Lutron Electronics Co., Inc. Although the Orion control has full memory of its condition before a power interruption, it may be designed to return to predetermined settings, independent of its original condition. For example, one recovery mode for the Orion system is a gradual increase in load power up to a predetermined value.

In all cases where a system returns to a predetermined condition after a power failure and recover, it remains in that condition until some input is received from the user to indicate what state it should be in. Once the user input is received—for example, by manipulation of a switch or control—the system changes from the predetermined condition to the new condition requested by the user and thereby resumes normal operation.

However, this prior art recovery method, where the predetermined condition is maintained until there is user input can cause problems in a lighting control system. As an example, consider a system that returns to the "off" condition, and assume it is installed to control the lighting in a public space. When power fails, all the normal lights go out and, usually, emergency lighting is activated. This allows sufficient light for security and safe movement of the people in the space. However, when power returns, the emergency lighting automatically extinguishes. Since the control system returns from a power outage in the "off" state, the normal lights do not come back on, and the space may be plunged into darkness, with a possibility of distress or injury for the people in the space.

Alternatively, if the system returns to full "on", there is no safety problem. However, if the lights are off and there is then a short power outage, the system will turn the lights full on, where they may remain for a long period of time, wasting energy, if no one is present to notice the lights on and to turn them off.

SUMMARY OF THE INVENTION

The present invention overcomes the limitations of prior art systems by providing a dynamic power-recovery sequence, in place of the prior art static, predetermined condition. In one embodiment of the invention, the system recovers to a first predetermined output level and then changes to a second predetermined output level over a period of time. If the first level is relatively bright, the safety of people in the space can be assured, and if the second level is relatively dim (or off), minimal energy will be wasted if no one is present to correct the system condition. The optimum time to progress from the first level to the second level is determined by how long a high light level is needed to insure safety. In the first example, one minute is generally preferred, because the high level exists for a sufficiently long period to enable the user to re-adjust his lights to the desired settings, before the system progresses to the second level. Clearly other intervals could be used.

In an alternative embodiment of the invention, the output of a system progresses from a first setting to a second setting in a manner designed to alert the user to the fact that the system requires an input to resume normal operation. A simple linear fade, where light level changes gradually, although usable, may not be readily apparent to the user if it takes place over a long time interval, such as a minute or more. A more recognizable progression is a sequence of steps in light level, with each step being a change in light intensity of about 5% or more in an interval of less than about one second. These steps could repeat at regular intervals of a few seconds, and continue until the final (second) light level is reached.

In a preferred embodiment of the invention, the first level is essentially full "on", the second level is generally less than about 5% light intensity, and the progression from the first to second level is made in a sequence of steps. There are 14 steps from the first to the second level, and each step occurs about 4 seconds after the previous step, so the total time from the first to the second level is about 56 seconds.

In another embodiment of the invention, the system may oscillate back and forth between the first and second levels until the user provides an input. This may be desirable to alert the user that the system is in an unusual condition and requires his action to return to normal operation. Of course, in this case, more energy would be used than the case of a simple progression from the first level to the second as was described above. However, this embodiment might be preferable in installations where the space whose lighting was being controlled was generally occupied. This type of operation is similar to known digital clock displays that are powered from an A.C. line and provide a flashing display condition following a power outage to alert the user that the displayed time may be incorrect and requires adjustment. Once the time is adjusted, the clock display returns to steady operation.

In all embodiments of the invention, any user input during the recovery sequence immediately returns the system to normal operation in the condition commanded by that input.

The invention is particularly advantageous in systems that use wireless (e.g., infrared) transmitters to signal a receiver, which in turn controls the power supplied to a lighting load. In this situation, the user selects the desired light level at the transmitter, with an explicit control (as described in U.S. patent application Ser. No. 079,847, filed Jul. 30, 1987 now continuation application Ser. No. 07/430,922 filed Nov. 1, 1989 which issued as U.S. Pat. No. 5,146,153), with "raise" and "lower" buttons or by choosing among a number of preset light levels. This information is communicated to the receiver via the wireless link. Typically, the transmitter transmits a signal only while the user is operating the transmitter or for a brief period of time after the user stops operating the transmitter. The received signal is stored by the receiver to provide continuous information to the power controller. If power to the receiver is now interrupted and the receiver has no memory, there is no way to reconstruct the light level information, since, in general, the transmitter is no longer transmitting. Hence, it is advantageous to incorporate a dynamic power-recovery sequence, as described above.

DETAILED DESCRIPTION OF THE INVENTION

Figure 1:
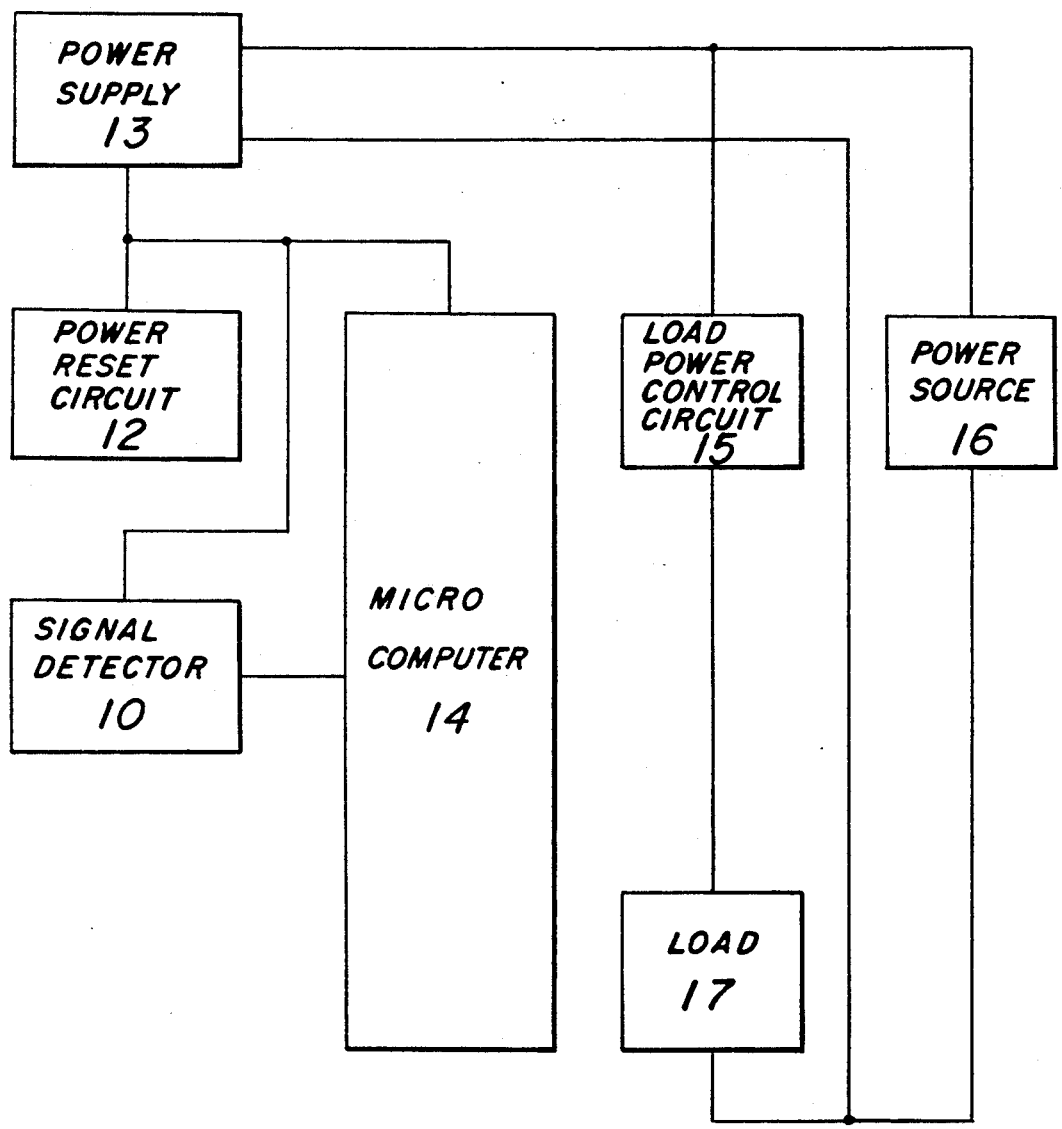
FIG. 1 is a block diagram of a control system of the present invention.

FIG. 1 illustrates one embodiment of the control system of the invention. During normal operation, the system operates as follows. Microcomputer 14 commands load power control circuit 15 to set the power delivered to load 17 from source 16 at a desired value. When a signal is received by signal detector 10, microcomputer 14 is commanded to modify the power delivered to load 17 through load power control circuit 15 in accordance with an algorithm stored in the program memory of microprocessor 14. For example, the microcomputer 14 may set the power delivered to load 17 to a specific value, which may be predetermined or a function of the signal received. Alternatively, the signal may select one of several predetermined values, or it may simply cause the load power to increase or decrease from its present value. Other possible implementations will also occur to those skilled in the art.

Figure 2:
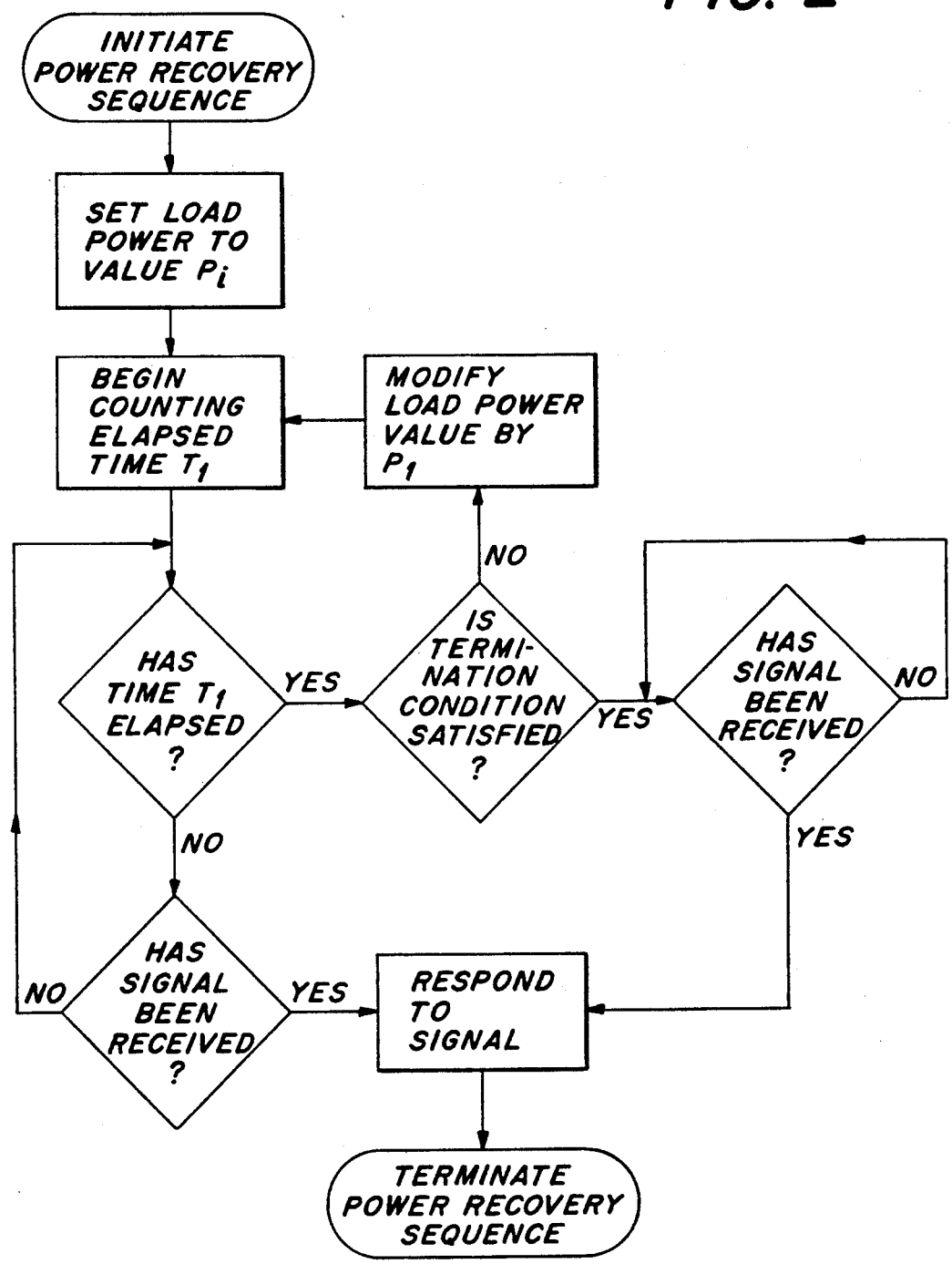
FIG. 2 is a flow chart of a dynamic power-recovery sequence.

Following an interruption in power from source 16, and before any signals are received by detector 10, microcomputer 14 provides power to load 17 in accordance with a dynamic power-recovery sequence, a flow chart of which is shown in FIG. 2. Microcomputer 14 is commanded to begin this sequence by the signal received from power reset circuit 12, upon application or re-application of power.

In accordance with FIG. 2, microcomputer 14 first sets the power in load 17 to an initial value and then checks to see if a predetermined time interval $T_1$ has passed. Microcomputer 14 then checks to see if signal detector 10 is receiving a valid signal. If no signal is being received, microcomputer 14 again checks to see if the interval $T_1$ has elapsed. As can be seen from FIG. 2, the microcomputer 14 alternates between checking for a signal and checking for the end of the time interval $T_1$. If no signal is received by the end of the time interval $T_1$, microcomputer 14 checks to see if the termination condition for the power recovery sequence is satisfied; if not, it modifies the power delivered to load 17 by an amount $P_1$. The termination condition could be a certain number of cycles of modification of load power, or total elapsed time since restoration of power, or other suitable termination condition, as may be desired. Once the termination condition is satisfied, no further changes in power to load 17 occurs until a signal is received by signal detector 10. If the termination condition is not satisfied, microcomputer 14 continues to modify the power delivered to load 17 at the end of each elapsed time interval $T_1$, until such time as a signal is received by signal detector 10, or the termination condition is satisfied, whichever occurs first. If a signal is received by signal detector 10 before the termination condition is satisfied, the dynamic power-recovery sequence described above is discontinued and microcomputer 14 resumes its normal operation, causing the power to load 17 to be adjusted in accordance with the received signal.

Of course, many modifications and specific implementations of the structure in FIG. 1 and program in FIG. 2 will occur to those skilled in the art. To illustrate, the step of modifying the power delivered to load 17 could be implemented by a constant increase each time, a constant decrease each time, or a proportional increase or decrease. Further, the power could be selected from a table of power values at each step. Also, in addition to modifying the power output at each step, the elapsed time $T_1$ also could be changed to give a non-uniform progression of light with respect to time. There need be no termination condition, in which case the power level continues to vary indefinitely, until a signal is received by signal detector 10, as previously described.

It is possible to obtain a wide variety of dynamic power recovery sequences by adjusting the values of the variables described above.

For example, by keeping the time interval $T_1$ and power level modification $P_1$ small, the steps in power output level may be made imperceptibly small, and the appearance of a continuous, smooth power level change can be realized. By starting from a high light level and smoothly decreasing the light to a lower level, a period of adequate lighting allows a user to respond to the restoration of power, if necessary.

Alternatively, if the initial power level $P_i$ is set at maximum (100%) and the reduction in power level $P_1$ after each time interval $T_1$ is one sixth of the maximum level; by setting $T_1$ equal to 5 seconds, the dynamic power-recovery sequence will be as follows. On recovery of power, the output power level immediately goes to 100% and every 5 seconds will drop by one sixth of the maximum level until the termination condition is satisfied. The termination condition could be when the microcomputer has gone through the loop 5 times. This would give a final power level of one sixth of maximum. Hence, the power level steps down from a maximum to some minimum value.

Figure 3:
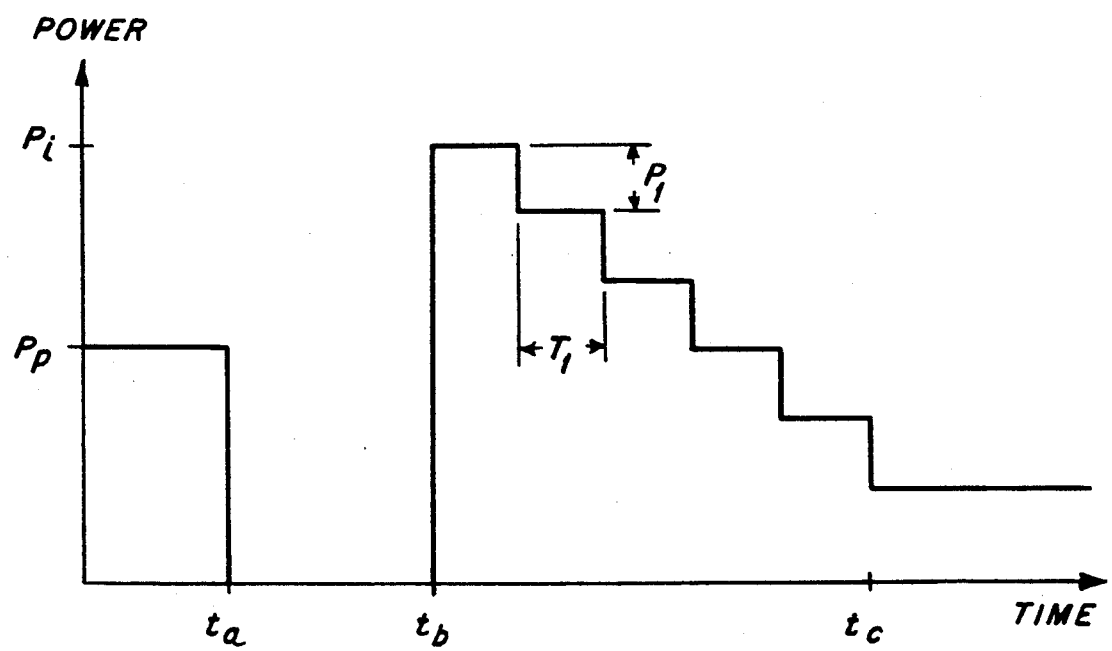
FIG. 3 is a graphical representation of a particular power-recovery sequence.

This sequence of events is illustrated in FIG. 3. The power level prior to the power interruption in $P_p$. At time $t_a$ power is interrupted and the output power level from the system drops to zero. Some time later, at time $t_b$, power is restored to the power control system. The output power level to the load is immediately set to $P_i$ and stays at that level until a time $T_1$ has elapsed, at which time the output power level is decreased by an amount $P_1$. This sequence of waiting a period $T_1$, and reducing the output power level by an amount $P_1$ is repeated until time $t_c$, at which point the system has gone through the loop 5 times and a final power level of one sixth of maximum has been reached.

Initial power level $P_i$ may be chosen to be small and the power level increased an amount $P_1$ after each time period $T_1$ to provide recovery sequences that start out with low power levels are then increased.

If the sign of $P_1$ is changed after each time period $T_1$, then power output levels that oscillate between high and low values can be obtained.

The signal detector 10 could be adapted to respond to wired or wireless signals, and the wireless signals could be carried on infrared radiation, radio frequency radiation, or the like. Also note that signal detector 10 could respond to signals from a wired control device, such as a linear slide potentiometer, or a set of raise/lower push buttons, in alternative embodiments of FIG. 1.

Figure 4:
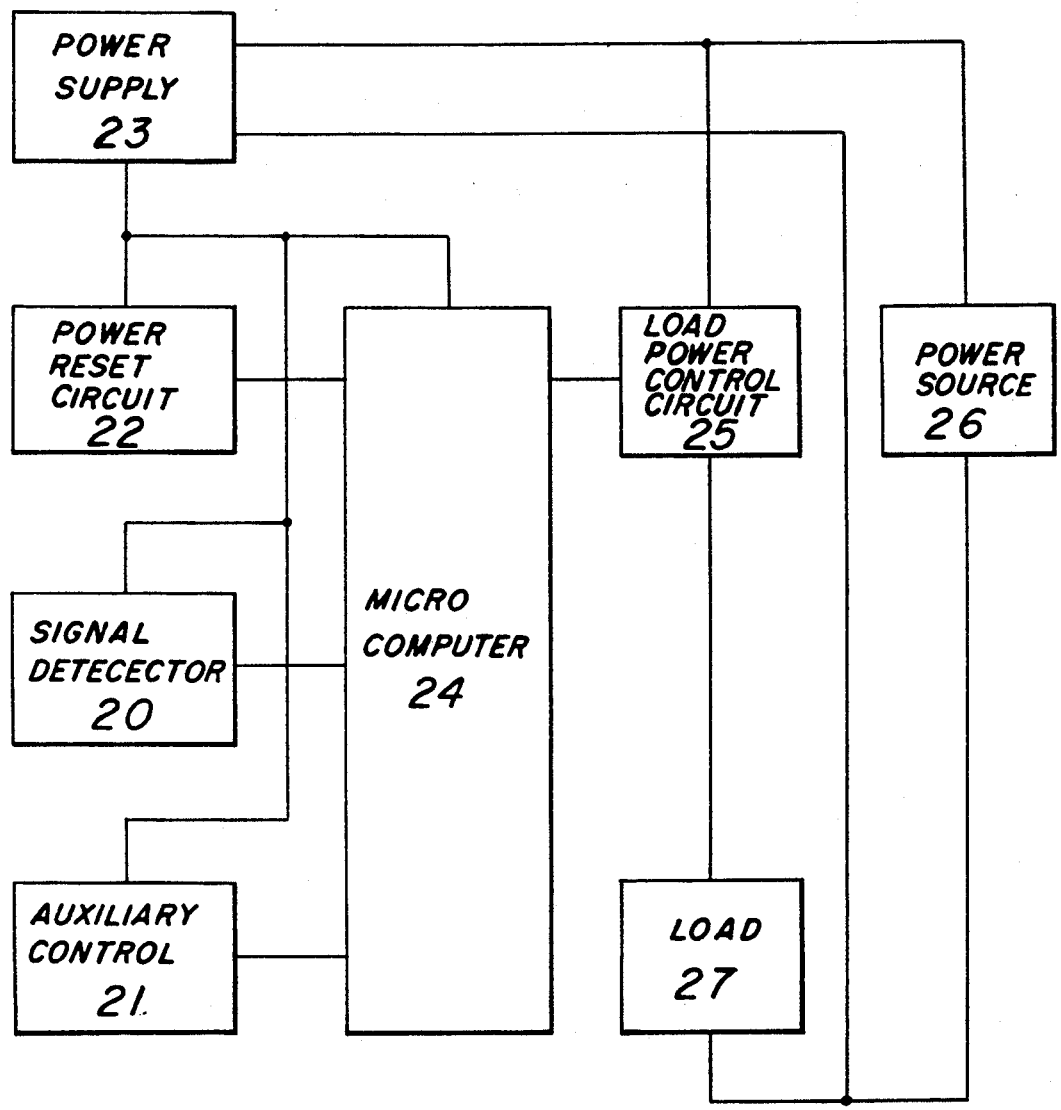
FIG. 4 is a block diagram of an alternative control system to that of FIG. 1.

A second embodiment of the invention is shown in FIG. 4. Here, an auxiliary control 21 has been added, which provides an additional input to microcomputer 24. The program of microcomputer 24 includes appropriate instructions to determine how the power to load 27 is to be adjusted with changes in auxiliary control 21. This auxiliary control 21 may be a local potentiometer, which is physically attached to the system of FIG. 4, or it could be remotely mounted. In any case, the program of microcomputer 24 would be designed to set the power to load 27 to the value commanded by either auxiliary control 21 or signal detector 10, whichever has been most recently activated.

Figure 5:
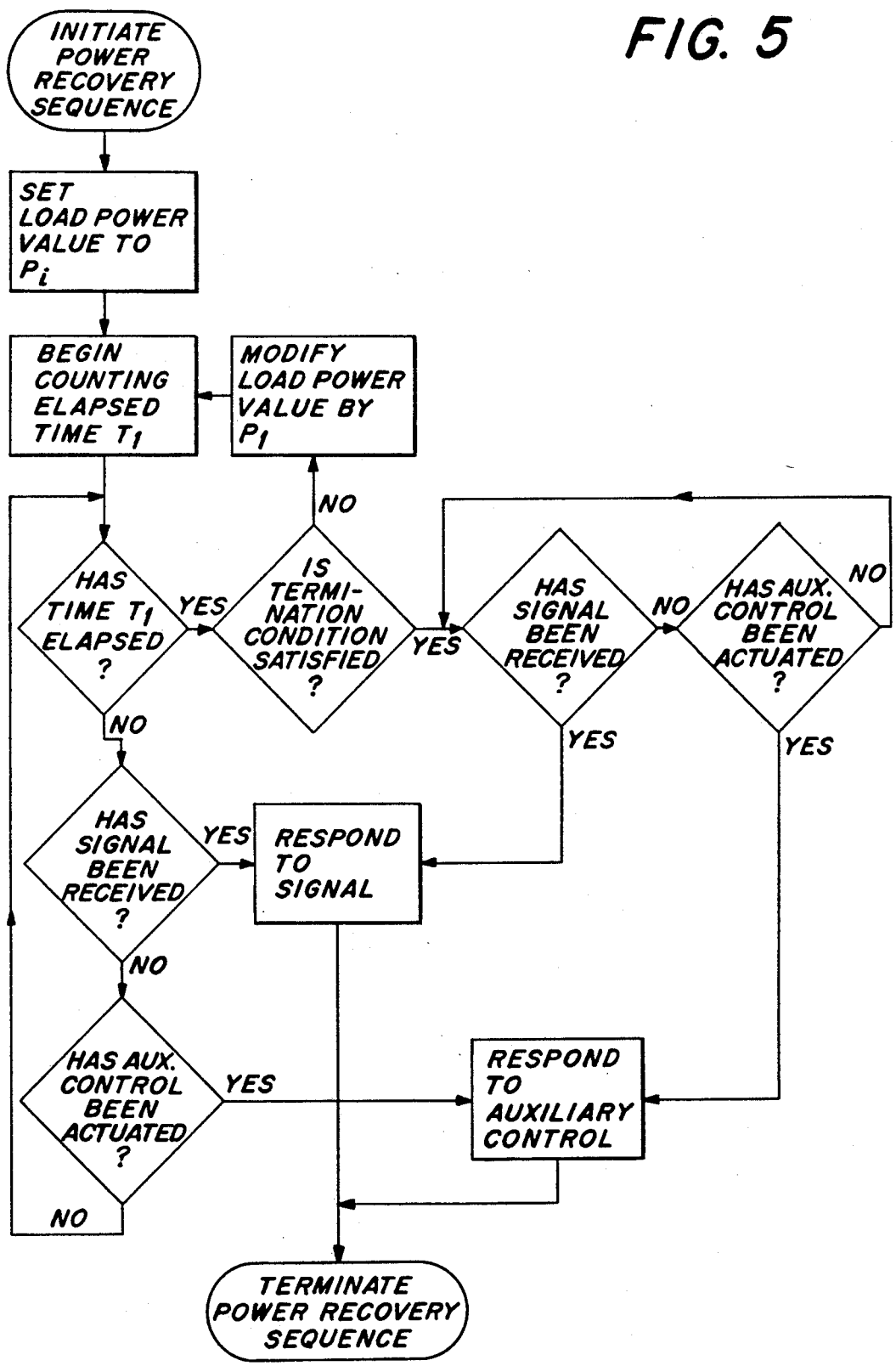
FIG. 5 is a flow chart that depicts the operation of the control system of FIG. 3.

FIG. 5 is a modified flow chart which describes the operation of microcomputer 24 of FIG. 4. Note that FIG. 5 is similar to FIG. 2, except additional decision blocks have been added to check for activation of auxiliary control 21, as well as signals from signal detector 20. Also, the load power may be determined by either auxiliary control 21 or signal detector 20, as discussed above. Therefore, the power-recovery sequence as described in FIG. 5 may end with the power to load 27 being determined by either signal detector 20 or auxiliary control 21, depending on which of these components is used to terminate the power-recovery sequence. It should be noted that signal detector 20 and auxiliary control 21 do not have to affect the power applied to load 27 in the same or even similar ways. For example, signal detector 20 could receive an infrared signal to raise and lower the power to load 27, while auxiliary control 21 could be a potentiometer to explicitly set the power to load 27 to a specific value, dependent upon the position of the potentiometer's actuator.

Figure 6:
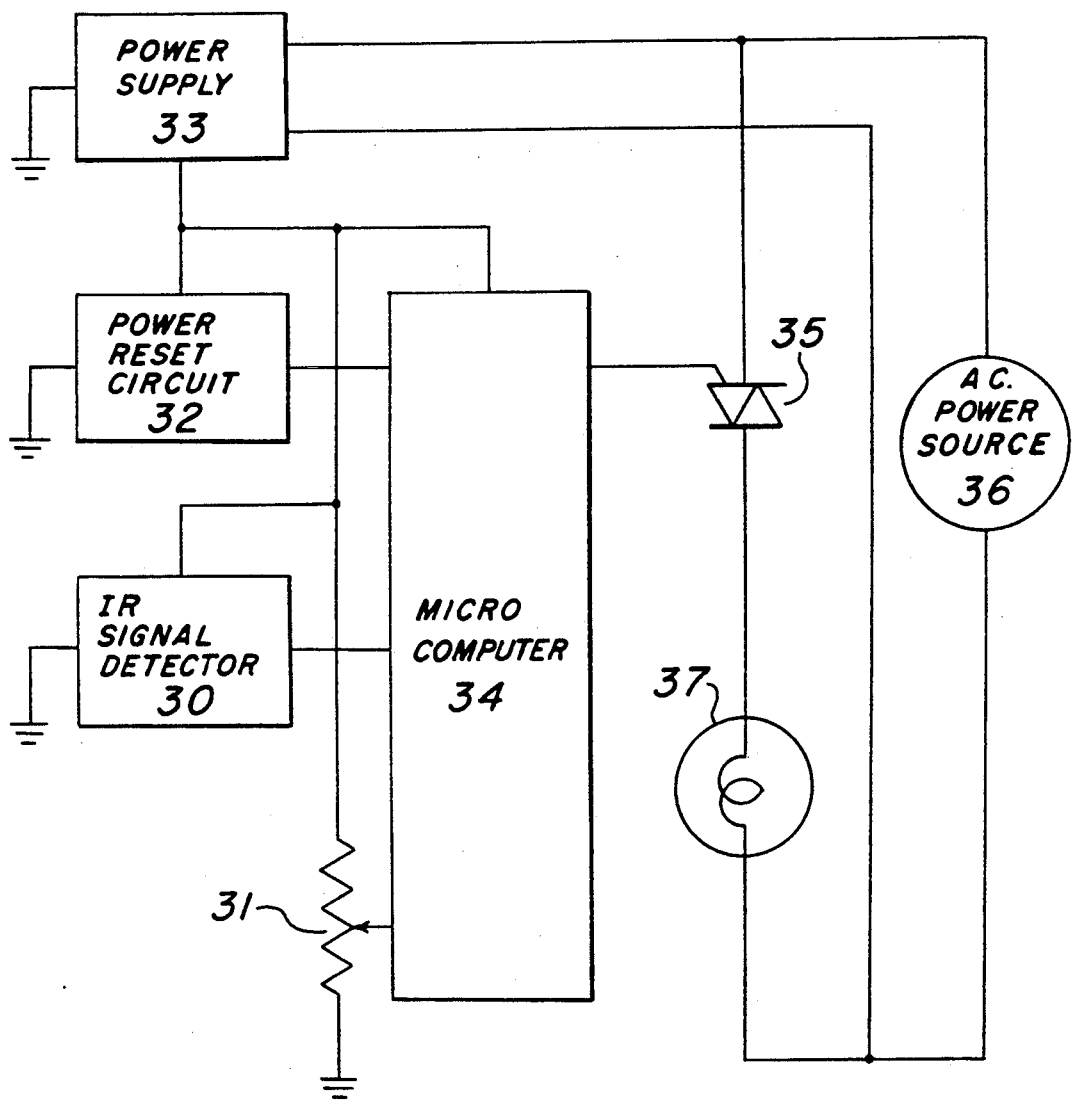
FIG. 6 is a block diagram of another control system of the invention.
Figure 7:
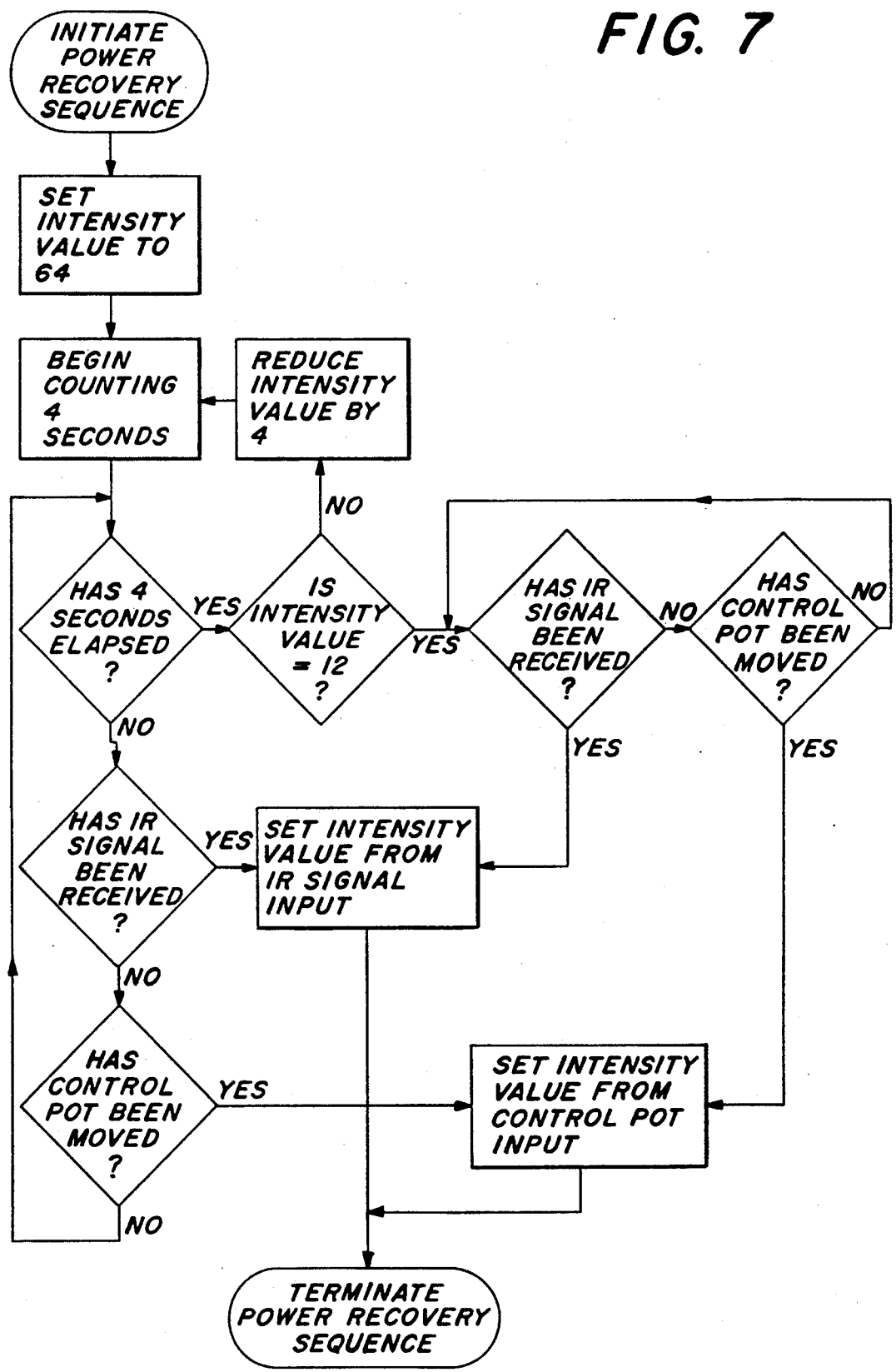
FIG. 7 is a flow chart that depicts the operation of the control system of FIG. 5.

A preferred embodiment of the invention is shown in FIG. 6, and the flow chart for the microcomputer 34 of FIG. 5 is shown in FIG. 7. In this preferred embodiment, an infrared signal receiver 30 receives transmissions and sends a control signal to microcomputer 34. Microcomputer 34 controls the firing of triac 35 to regulate the power supplied from the A.C. power line 36 to lighting load 37.

Figure 8:
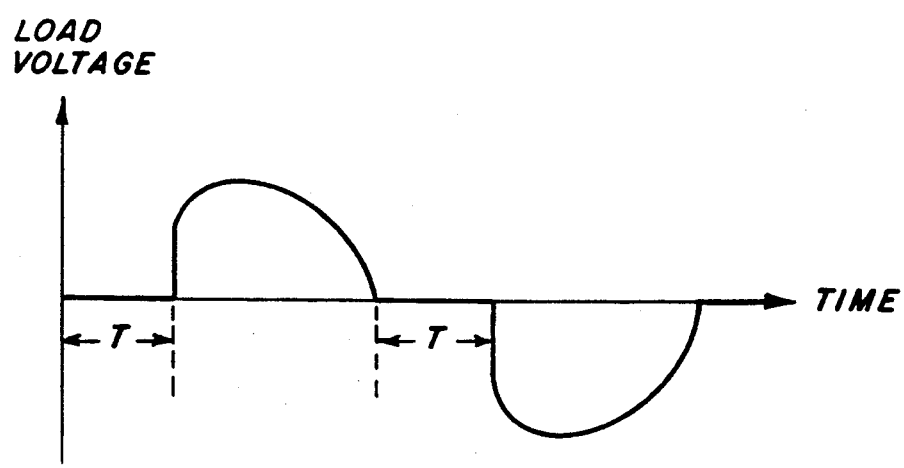
FIG. 8 is a graphical representation of a triac-controlled load voltage.

Triac 35 applies to load 37 a voltage that is shown in FIG. 8. The delay time T in FIG. 8 is controlled by microcomputer 34 to cause the effective value of the voltage at load 37 to vary over a range of values. In the preferred embodiment, delay time T varies from a minimum value of about 1.9 milliseconds to a maximum value of about 6.8 milliseconds, which correspond to nearly 100% light and less than 0.1% light, respectively, when load 37 is a standard 120 volt, 60 watt incandescent light bulb. Other loads yield different light outputs for these same values of delay time T, but a delay time T of 1.9 milliseconds gives a light output close to nominal and a delay time T of 6.8 milliseconds gives a light output that is much less than nominal with most lighting loads, where the nominal value is the light output obtained with full line voltage applied to load 37.

Microcomputer 34 maintains an internal intensity value V, which directly corresponds to the value of delay time T, such that when the maximum light output is desired, the intensity value V maximum is 64, which corresponds to a delay time T of about 1.9 milliseconds, and when minimum light output is desired, the intensity value V minimum is 5, corresponding to a delay time T of about 6.8 milliseconds. For each increment of change of intensity value V, the delay time T is modified by about 0.08 milliseconds, with T becoming longer as the intensity value decreases. The change in light output obtained for a change in T of 0.08 milliseconds varies depending on the characteristics of the actual light source used as load 37 and the value of T before the change.

Power supply 33 also receives energy from A.C. power line 36 and provides appropriate voltages to the other elements of the system. Power reset circuit 32 signals microcomputer 34 when power is restored after an interruption. Potentiometer 31 provides an additional signal to microcomputer 34 as determined by of the position of the potentiometer's actuator. Microcomputer 34 is adapted to control the firing of triac 35 (and therefore, the power to load 37) in accordance with either the setting of potentiometer 31 or a signal from infrared receiver 30, depending on which of these two components was most recently activated. Activation of infrared receiver 30 occurs when it receives properly coded infrared signals, and activation of potentiometer 31 occurs when its actuator position is displaced from its previous setting.

FIG. 7 is the flow chart for the operation of microcomputer 34 in the preferred embodiment. After the initiation of the power recovery sequence by receipt of a signal from power reset circuit 32, the intensity value that determines the light level of load 37 is set to 64 ($V_{max}$). This causes the delay time T of FIG. 8 to be about 1.9 milliseconds and corresponds to essentially full light intensity of load 37, as described previously.

The program then enters a loop, where it looks for inputs from either infrared receiver 30 or potentiometer 31. If no input is received for about 4 seconds ($T_1$), the program checks the intensity value (which was initialized to 64 above) to see if it has fallen to its termination value of 12. This yields a "second-level" light intensity somewhat above the minimum intensity—which corresponds to a value of V=5. If not, the intensity value V is reduced by 4, which causes the delay time T to increase by about 0.32 milliseconds and thereby abruptly reduces the light output from load 37 by a small but perceptible amount. The program then again starts the 4 second elapsed timer and continues to look for the activation of either infrared receiver 30 or potentiometer 31.

If no activation of either infrared receiver 30 or potentiometer 31 is detected, the system continues to decrease the light level to load 37 in small steps, approximately every 4 seconds, until the intensity value V falls to its termination value of 12. At this time, the system begins to wait for activation of either infrared receiver 30 or potentiometer 31, and the light level remains constant at a very low level of less than about 5% of full intensity until one of the two inputs is activated. Upon activation, the system immediately adjusts the power to load 37 to be in accordance with the signal received by infrared receiver 30 or the position of potentiometer 31, whichever was activated.

If either infrared receiver 30 or potentiometer 31 is activated before the intensity value V reaches its termination value of 12, the system immediately adjusts the power to load 37 to a value in accordance with the signal received by infrared receiver 30 or the position of potentiometer 31, terminating the power-recovery sequence at this point, without waiting for the intensity value to reach its termination value of 12.

In a preferred embodiment of the invention, infrared receiver 30 may be model number GP1U56, manufactured by Sharp Electronics of Osaka, Japan. Potentiometer 31 may be a linear slide potentiometer, model number S3018G601A, by Alps Electric Co., Ltd., Tokyo, Japan. Power reset circuit 32 may be implemented with an integrated circuit model number DS1232, as manufactured by Dallas Semiconductor, Dallas, Tex. Power supply 33 may be a standard rectifier, filter capacitor and integrated circuit regulator chip, such as model number 78L05 by Motorola Electronics, Austin, Tex. Microcomputer 34 may be model number 68HC05 as manufactured by Motorola Electronics, Austin, Tex. Triac 35 may be model number SAC686-1, as manufactured by Motorola, Inc., Phoenix, Ariz. AC power line 36 may be the 120 volt, 60 Hz line voltage commonly used in the USA for residential and commercial electrical service; however, clearly, other voltages and frequencies may also be used. Lighting load 37 may be a standard 120 V incandescent lamp. With appropriate changes to the power control circuitry, other types of lamps, e.g., fluorescent, may be used.

The above embodiments of the invention are not to be considered the only means by which the invention may be implemented. Many modifications and variations of the disclosed embodiments will occur to those skilled in the art. For example, the invention may be implemented using discrete digital logic gates or even individual electronic components in place of the microcomputer-based embodiments described above. Other power control components, such as transistors or power FETS may be used to control power to the load, and many types of auxiliary control devices and signal detectors may be used. Therefore, it is intended that nothing in this description shall be construed as limiting the invention in any way, and that such limitations are only as described in the appended claims.

We claim:

1. A system for dynamically controlling power supplied from a source to a load comprising, in combination:
   a) means for detecting the reapplication of power to said system after interruption of power from said source, said detecting means generating a signal in response to said reapplication,
   b) microcomputer means for setting to a first predetermined non-zero initial value the power supplied to said load in response to said signal generated in response to said detected reapplication of power, said microcomputer means for setting being further responsive to a command signal generated by at least one operable control means for immediately returning the system to normal operation, wherein said microcomputer means for setting power supplied to said load has separate operating routines for responding to said means for detecting said reapplication of power and for responding to each of said at least one operable means so as to separately adjust said power supplied to said load to a plurality of different values and
   c) means for changing the first predetermined value of said power in a predetermined manner.

2. The system of claim 1 wherein said system is devoid of means for retaining, after interruption of power, information concerning the value of power supplied to said load before said power interruption.

3. The system of claim 1 wherein said first non-zero initial value is a substantial fraction of the power deliverable to said load by said source.

4. The system of claim 3, wherein said first non-zero initial value provided by said microcomputer means for setting is reduced, by said means for changing, to a predetermined second value, after a predetermined interval of time, said predetermined interval of time being determined by said microcomputer means for setting.

5. The system of claim 4 wherein said reduction to said second predetermined value is accomplished in a single step.

6. The system of claim 4 wherein said reduction to said second predetermined value is accomplished in a plurality of steps.

7. The system of claim 4 wherein said reduction to said second predetermined value is accomplished substantially continuously during said time interval.

8. The system of claim 1 wherein said load is a lighting load, having a variable light intensity output.

9. The system of claim 8, wherein said operable control means for immediately returning the system to normal operation is a manual device.

10. The system of claim 9 wherein said manual device comprises a pushbutton switch for raising and lowering said operating power to said lighting load.

11. The system of claim 9 wherein said manual device comprises a plurality of pushbutton switches for selecting among a plurality of predetermined levels of operating power to said lighting load.

12. The system of claim 9 wherein said manual device means comprises a position-sensing touch element.

13. The system of claim 9 wherein said manual device is located on a transmitter, said transmitter being adapted for remotely controlling power to said lighting load.

14. The system of claim 13 further comprising second manually operable control means for immediately returning the system to normal operation, said second manually operable control means generating a command signal which is responded to by said means for setting.

15. The system of claim 14 wherein said means for setting responds to the last received command signal from either said manual device located on said transmitter or said second manually operating means.

16. The system of claim 9 wherein said command signal of said operable control means is responded to by said means for setting by discontinuing the setting of said first predetermined non-zero initial value of power to said load.

17. The system of claim 9 wherein said means for detecting said reapplication of power, said means for setting said power supplied to said load, said means for changing the value of said power and said manually operable control means are all contained within a single housing which is adapted to be mounted in a standard electrical wallbox.

18. The system of claim 1 further comprising means to control power to a plurality of additional loads, wherein power supplied to each load is independently set to a first predetermined non-zero initial value in response to detection of reapplication of power and subsequently changed independently in a predetermined manner.

19. A system for dynamically controlling power supplied from a source to a load comprising, in combination:
   a) means for detecting the reapplication of power to said system after interruption of power from said source, said detecting means generating a signal in response to said reapplication,
   b) microcomputer means for setting to a first predetermined initial value the power supplied to said load in response to said signal generated in response to said detected reapplication of power, said microcomputer means for setting being further responsive to a command signal generated by at least one operable control means for immediately returning the system to normal operation, wherein said microcomputer means for setting power supplied to said load has separate operating routines for responding to said means for detecting said reapplication of power and for responding to each of said at least one operable means so as to separately adjust said power supplied to said load to a plurality of different values and
   c) means for changing the first predetermined value of said power subsequently supplied to said load to a plurality of predetermined values in a predetermined sequence of discrete steps.

20. The system of claim 19 wherein said load is a lighting load, having a variable light intensity output.

21. The system of claim 19 wherein said first predetermined initial value is a substantial fraction of the power deliverable to said load by said source.

22. The system of claim 21 wherein said first predetermined initial value is reduced to a predetermined second value in said predetermined sequence of discrete steps.

23. The system of claim 21 wherein said first predetermined initial value is substantially instantaneously reduced to a second predetermined value after a first predetermined interval of time and is then substantially returned to said first predetermined initial value after a second predetermined interval of time, said power supplied to said load continuing to alternate between said first predetermined initial value and said second predetermined value.

24. The system of claim 19 wherein said first predetermined initial value is a small fraction of the power deliverable to said load by said source.

25. The system of claim 24 wherein said first predetermined initial value is increased to a predetermined second value in said predetermined sequence of discrete steps.

26. The system of claim 24 wherein said first predetermined initial value is substantially instantaneously increased to a second predetermined value after a first predetermined interval of time and is then substantially instantaneously returned to said first predetermined initial value after a second predetermined interval of time, said power supplied to said load continuing to alternate between said first predetermined initial value and said second predetermined value.

27. The power system of claim 19 wherein said system is devoid of means for retaining, after interruption of power, information concerning the value of power supplied to said load before said power interruption.

28. The power control system of claim 20 wherein said operable control means for immediately returning the system to normal operation is a manual device.

29. A system for dynamically controlling power supplied from a source to a lighting load, comprising, in combination:
   a) means for detecting the reapplication of power to said system after interruption of power from said source, said detecting means generating a signal in response to said reapplication, and
   b) microcomputer means for varying the power to said lighting load, between first and second predetermined non-zero values in a predetermined sequence in response to said signal generated in response to said detected reapplication of power, said microcomputer means for varying being further responsive to a command signal generated by at least one operable control means for immediately returning the system to normal operation, wherein said microcomputer means for varying power supplied to said lighting load has separate operating routines for responding to said means for detecting said reapplication of power and for responding to each of said at least one operable means so as to separately adjust said power supplied to said lighting load to a plurality of different values.

30. The system of claim 29 wherein said power to said lighting load is varied sinusoidally between said first and second predetermined values.

31. The system of claim 29 wherein said power to said lighting load ramps substantially linearly between said first and second predetermined values.

32. The system of claim 29 wherein said power to said lighting control system alternates substantially instantaneously between said first and second predetermined values at predetermined times.

33. The system of claim 29 wherein said operable control means for are manual devices and each generates a command signal.

34. The system of claim 33 wherein said command signals generated by said manual controls are responded to by said means for setting by discontinuing said setting of said first and second predetermined non-zero values.

* * * * *